United States Patent [19]

Buckner

[11] 4,241,811
[45] Dec. 30, 1980

[54] BRAKE MECHANISM FOR A GONDOLA CAR LOADER

[75] Inventor: Walter E. Buckner, Hartselle, Ala.

[73] Assignee: Lucky Manufacturing Co., Inc., Huntsville, Ala.

[21] Appl. No.: 949,116

[22] Filed: Oct. 6, 1978

[51] Int. Cl.³ ............................................. B61H 7/12
[52] U.S. Cl. ...................................... 188/43; 104/137
[58] Field of Search ................... 188/71.5, 33, 38, 41, 188/43, 153 R; 104/137; 414/339

[56] References Cited

U.S. PATENT DOCUMENTS

| | | | |
|---|---|---|---|
| 708,837 | 9/1902 | Sebastian | 188/43 |
| 799,688 | 9/1905 | Steele | 188/41 |
| 1,650,456 | 11/1927 | Lorenze | 188/43 |
| 3,931,869 | 1/1976 | Fagel | 188/41 |
| 4,096,954 | 6/1978 | Buckner | 414/339 |
| 4,099,635 | 7/1978 | Leonard et al. | 414/339 |

*Primary Examiner*—Edward R. Kazenske

*Attorney, Agent, or Firm*—L. Lawton Rogers, III

[57] ABSTRACT

The present disclosure relates to a brake mechanism, particularly useful on a vehicle which travels on the upper side wall edges of gondola cars. The brake mechanism includes a brake shoe rack which carries two pairs of brake shoes, one pair of brake shoes being adapted to clamp one side wall of the gondola car and the other pair of brake shoes being adapted to clamp the other side wall of the gondola car. The pairs of brake shoes are moved in opposition to one another by a single hydraulic ram to effect the clamping of the side walls. The brake shoe rack is pivotally supported below the chassis of the gondola car loader by hydraulic cylinders for raising and lowering the brake shoe rack as the vehicle is moved from gondola car to adjacent gondola car. The brake shoe rack is also movable from side to side with respect to the chassis of the vehicle to enable the brake mechanism to accommodate gondola car side walls which are bowed or otherwise irregularly shaped.

6 Claims, 7 Drawing Figures

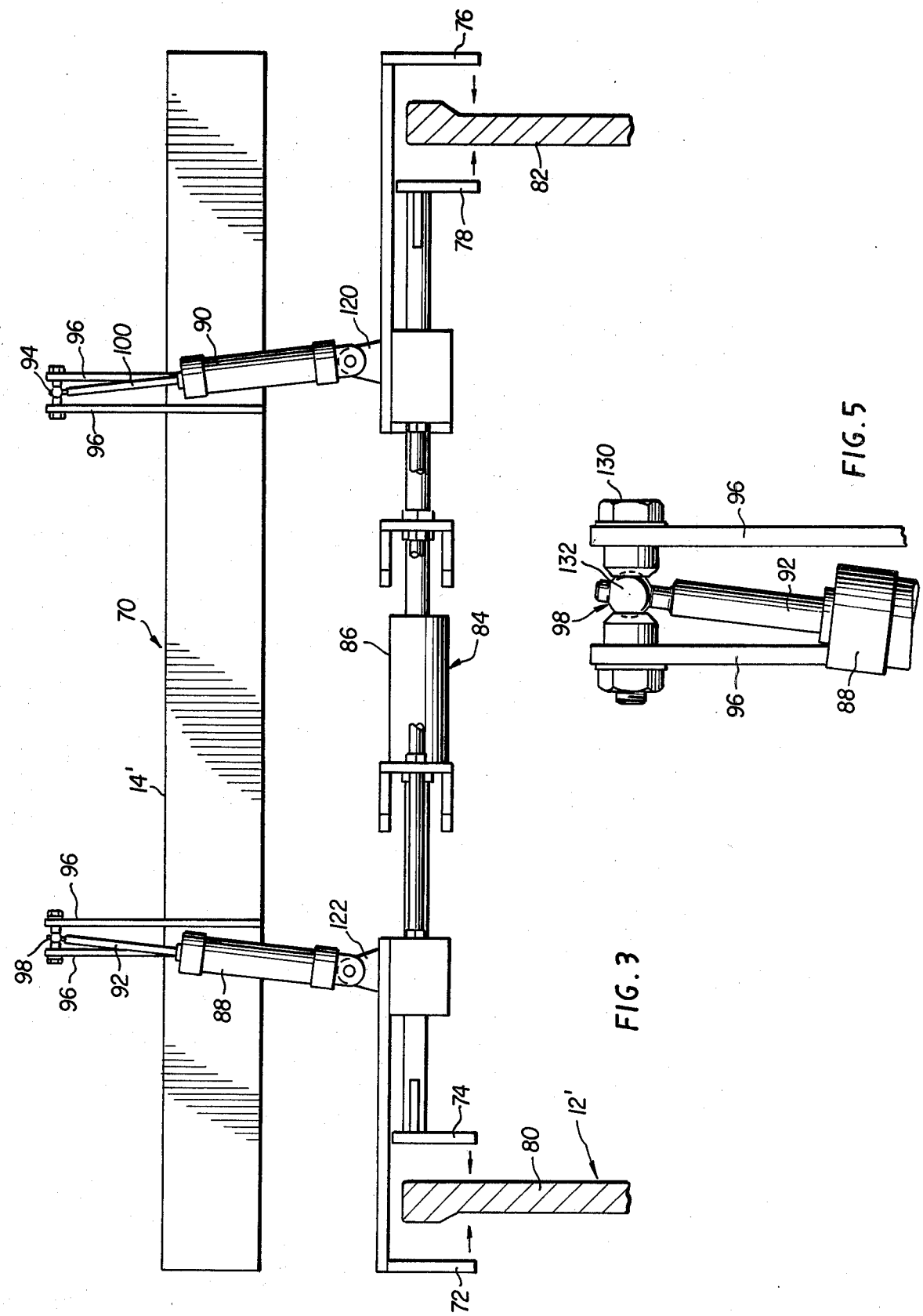

BRAKE MECHANISM FOR A GONDOLA CAR LOADER

BACKGROUND OF THE INVENTION

The present invention relates to a brake mechanism for a wheeled vehicle supported on parallel members, and, more particularly, for a gondola car loader such as the one shown in FIG. 1.

To facilitate an understanding of the present invention and its preferred application, the gondola car loader will be described generally. In FIG. 1 a gondola car loader is indicated generally by the numeral 10. The device is particularly useful for loading and unloading gondola railroad cars, such as gondola car 12, positioned adjacent one another along a railroad track. The gondola car loader may include a chassis 14 movable along the top edges of adjacent gondola cars in the direction of the railroad track 16 on which the cars are located. Four beams, such as beams 18 and 20, pivotally mounted near their centers to the chassis 14, may each carry wheels for engaging the top edges of the cars. Advantageously, each beam carries a wheel at both ends. As shown in FIG. 1, for example, the beam 18 is mounted for pivoting about the pivot point 22 and carries wheels 24 and 26 at either end. The beams are adapted to be pivoted to selectively engage the wheels with the top edges of immediately adjacent cars to support the chassis 14, thereby facilitating motion of the chassis across the gaps between adjacent cars. A knuckle boom 28, for loading and unloading cargo from the cars, may be rotatably mounted to the chassis 14.

The gondola car loader such as shown in FIG. 1 was developed for the applicant herein and is described in greater detail in applicant's U.S. Pat. Nos. 4,096,954 and 4,099,635.

Initially the gondola car loader was equipped with a braking mechanism such as that shown in FIGS. 2A and B. This braking mechanism was provided to secure the gondola car loader in position at times when the gondola car loader was not being moved along the tops of the gondola cars, particularly, at times when the knuckle boom was being employed to load and unload the gondola cars. Also, in situations where the gondola car loader was being used on a moving train, the braking mechanism could prevent unwanted motion of the gondola car loader caused by variations in the speed of the train.

The original gondola car loader braking apparatus included an outer brake shoe mechanism such as shown in FIG. 2A and an inner brake shoe mechanism such as shown in FIG. 2B.

Referring first to FIG. 2A, the outer brake shoe mechanism comprised a hydraulic ram 42 having a cylinder 44 and a piston rod 46. The cylinder 44 was connected to an outer brake shoe 48 and the piston rod 46 was connected to a second outer brake shoe 50 for engaging the opposite side wall of the gondola car 54. The braking mechanism was rigidly connected to the chassis 56 of the gondola car loader by means of sleeves 58 and 60 attached to longitudinal chasis members 62 and 64, respectively.

Referring now to FIG. 2B, the inner brake shoe mechanism included a first inner brake shoe and arm assembly 41 and a second inner brake shoe and arm assembly 43. A shoe portion 45 of the assembly is shown contacting an inner side of the wall 52 of the gondola car. The assemblies 41 and 43 are respectively connected to hydraulic rams 47 and 49 for pivoting about axes 51 and 53. For clarity, the hydraulic ram 47 is shown in an extended position wherein the shoe portion 45 of the assembly 41 engages with the wall 52 of the gondola car, and the hydraulic ram 49 is shown in a retracted position, wherein the shoe 45' of the second assembly 43 is out of contact with the wall 54 of the gondola. Normally, however, the hydraulic rams 47 and 49 would both be in their extended positions to effect braking, or in their retracted positions to move the assemblies 41 and 43 upward and away from the gondola car.

The braking mechanism 40 shown in FIGS. 2A and B was capable of providing braking action for the gondola car loader, but had a number of disadvantages, the most significant of which were that it required three hydraulic rams to activate the brake shoes, that it lacked rigidity, and that it interferred with movement of the loader from gondola car to gondola car.

Accordingly, it is an object of the present invention to provide a sturdy, inexpensive and easily fabricated braking mechanism, particularly suited for use with a gondola car loader.

Applicant devised the present invention which employs two pairs of braking shoes, a first pair being adapted to clamp one side wall of the gondola car, and the other pair being adapted to clamp the other side wall of the gondola car. The braking mechanism of the present invention is sturdier in construction, does not interfere with the movement of the loader and the braking mechanism is self-centering and provides clamping action which facilitates the straightening of bowed or otherwise irregularly shaped side walls often found on gondola cars.

The prior art contains brake mechanisms which employ pairs of brake shoes to clamp members on which a vehicle rides, to provide braking action. Such brake mechanisms are shown in U.S. Pat. No. 708,837 to Sebastian, U.S. Pat. No. 1,650,456 to Lorenze, and U.S. Pat. No. 2,856,030 to Snow, Jr. However, all of these prior art braking mechanisms are adapted for use for vehicles traveling on parallel rails such as railroad tracks and are not adapted for use on rails or members having an irregular shape. They are not, therefore, intended for use in straightening irregularly shaped members over which they ride. Finally, these prior art braking mechanisms are not adapted for use in the particular environment of a gondola car loader. The gondola car loader is adapted to move from gondola car to gondola cars, and in order to accomplish this, the gondola car loader must "walk" across gaps between adjacent gondola cars. Typically, gondola cars have end walls which are nearly the same height as the side walls on which the gondola car loader rides. If the inner brake shoes of the braking mechanism extend downward alongside the upper edges of the gondola car side walls, the inner shoes would impact the end walls of the gondola car and arrest the motion of the gondola car loader as it attempted to move across the gaps between adjacent gondola cars. Thus a conventional braking mechanism with inner brake shoes of fixed height would be unuseable on a gondola car loader.

Accordingly, it is an object of the present invention to provide a braking mechanism for a vehicle moveably supported on irregularly shaped but generally parallel members.

It is yet another object of the present invention to provide a braking mechanism for use with a vehicle adapted to be moveably supported on the upper edges of adjacent gondola cars.

While the above-mentioned prior art braking mechanisms employ pairs of braking shoes to clamp parallel members on which their vehicles ride, all of the prior art patents cited employ relatively complex mechanisms in order to move pairs of brake shoes in opposition simultaneously. Specifically, the Sebastian patent requires a manually rotated pair of double acting cams to actuate the brake shoes. In the Lorenze patent, as shown best in FIG. 2, the braking mechanism disclosed requires a pair of hydraulic rams and a complex scissors action mechanism to simultaneously actuate the pairs of brake shoes. Finally, the Snow, Jr., patent, as shown in FIG. 6 thereof, employs a sequence of four relatively massive levers 15 and 16 pivoted at points 22, 17, 50 in order to actuate the pairs of brake shoes.

None of the above cited patents disclose a floating brake mechanism or one that is capable of centering itself on irregularly shaped, generally parallel members on which a vehicle rides.

Accordingly, it is another object of the present invention to provide a simply and inexpensively fabricated vehicle brake, employing two pairs of brake shoes and a single hydraulic ram to clamp parallel members on which the vehicle is moveably supported.

It is yet another object of the present invention to provide a self-centering, floating braking mechanism employing two pairs of brake shoes for use on a vehicle adapted to ride on irregularly shaped supporting members which are also irregularly spaced but generally parallel.

These and other objects and features of the present invention will become apparent from the claims and from the following description when read in conjunction with the accompanying drawings.

THE FIGURES

FIG. 3 is a front view of an embodiment of the present invention.

FIG. 5 is a detail of FIG. 3 showing the suspension mechanism of the embodiment of FIG. 3.

DETAILED DESCRIPTION

Figure 1:
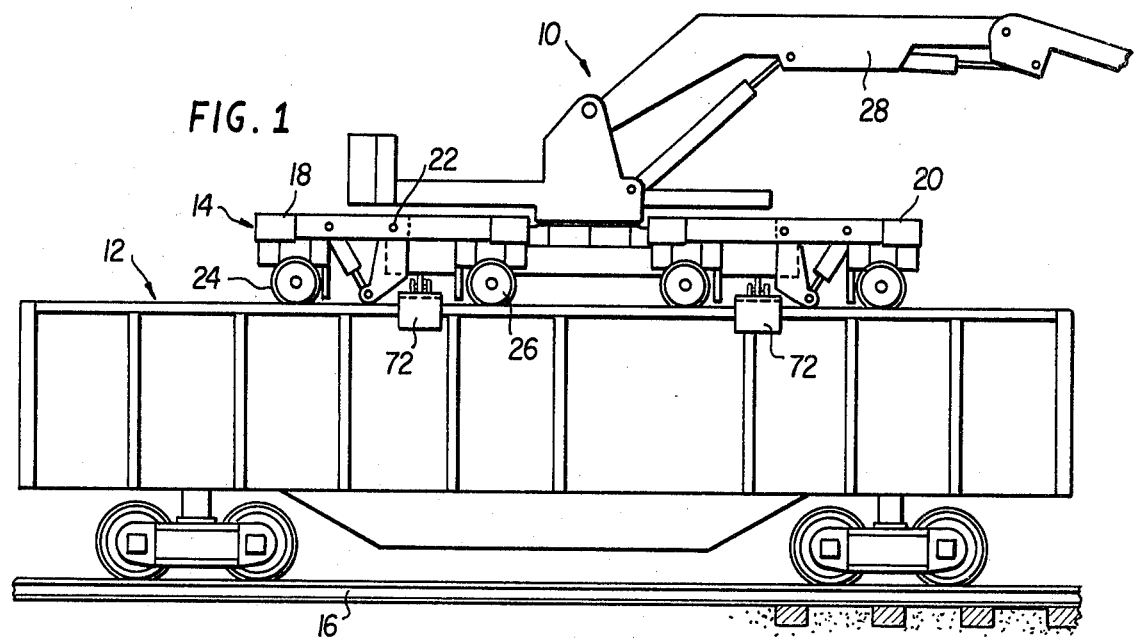
FIG. 1 is a side elevation of a gondola car loader on which the braking mechanism of the present invention may be employed.
Figure 2A:
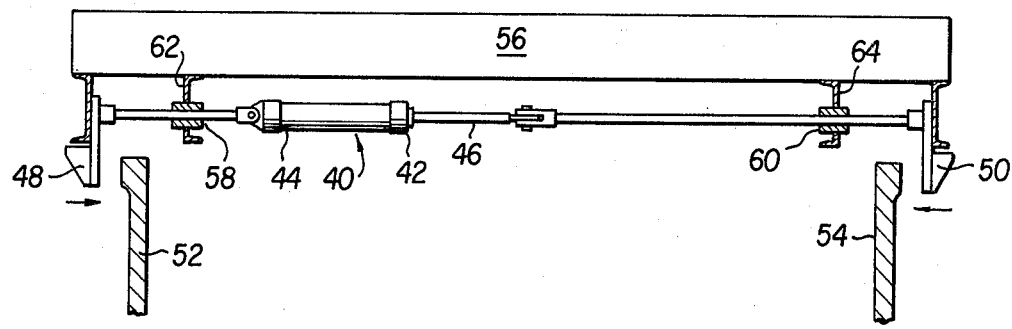
FIGS. 2A and 2B are front views of portions of a prior art braking mechanism for a gondola car loader.
Figure 2B:
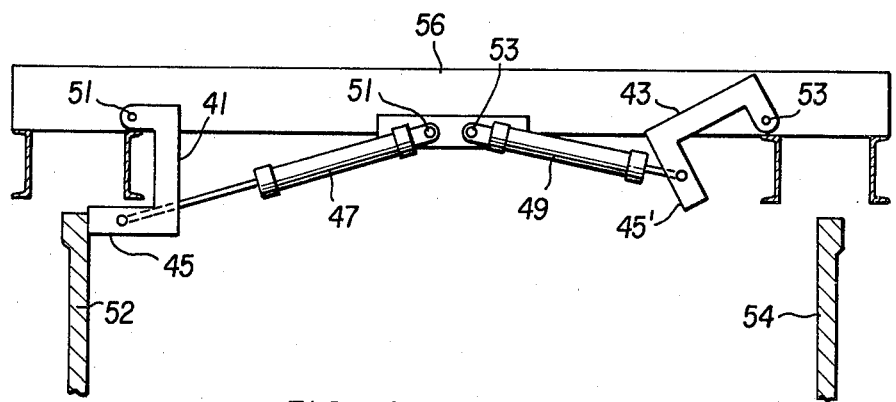

In accordance with the present invention, a brake mechanism is provided for a wheeled vehicle movable along generally parallel support members. In particular, the brake mechanism is adapted for use on a gondola car loader, i.e., a vehicle such as shown in FIG. 1, which is movably supported by wheels on the upper edges of the side walls of the gondola cars.

The braking mechanism may consist of a brake shoe rack which carries two pairs of brake shoes and a supporting structure for the brake shoe rack which permits the brake shoe rack to move from side to side with respect to the chassis. A first pair of brake shoes are provided which are selectively movable in opposition to one another to clamp a first side wall of the gondola car. Similarly, a second pair of brake shoes are also provided, selectively movable in opposition to one another, to clamp the second side wall of the gondola car. A single hydraulic ram is coupled to the brake shoes for moving the brake shoes to clamp and unclamp the side walls of the gondola car. The hydraulic ram may have a cylinder coupled to the inner brake shoe of one pair of brake shoes and to the outer brake shoe of the other pair of brake shoes. The piston of the hydraulic ram may be coupled to the remaining two brake shoes.

The supporting mechanism for the brake shoe rack may be constructed to permit the brake shoe rack to be selectively raised and lowered to clear end walls of the gondola car as the gondola car loader is moved across gaps between adjacent gondola cars. Moreover, since the brake shoe rack is movable from side to side with respect to the chassis of the gondola car loader, the brake mechanism will accommodate a gondola car side walls which are bowed or otherwise irregularly shaped.

With reference to FIG. 3, an embodiment of the braking mechanism of the present invention is denoted generally by the numeral 70. The mechanism includes a first pair of brake shoes, outer shoe 72 and inner shoe 74, and a second pair of brake shoes, outer shoe 76 and inner shoe 78. As shown in the figure, the pairs of brake shoes are movable in opposition to one another to clamp the side walls 80 and 82 of the gondola car 12'. Specifically the members of the brake shoe pairs are moved in opposition to one another by means of an hydraulic engine 84. Advantageously, the hydraulic engine may be an hydraulic ram having a cylinder 86 and piston.

Together the pairs of brake shoes, the hydraulic engine and members for connecting the shoes and hydraulic engine constitute a brake shoe rack. The brake shoe rack is suspended from the chassis 14' of the gondola car loader. In a preferred embodiment the means for suspending the brake shoe rack from the gondola car loader chassis includes a first hydraulic ram 88 and a second hydraulic ram 90, each having one end connected to the gondola car loader chassis and a second end connected to one of the outer brake shoes. Advantageously, piston rods 92 and 94 of each of the hydraulic rams 88 and 90 may be mounted to vertical support braces 96 of the chassis 14' by means of ball joints 98 and 100, the structure of which will be described in greater detail in connection with FIG. 5.

Figure 4A:
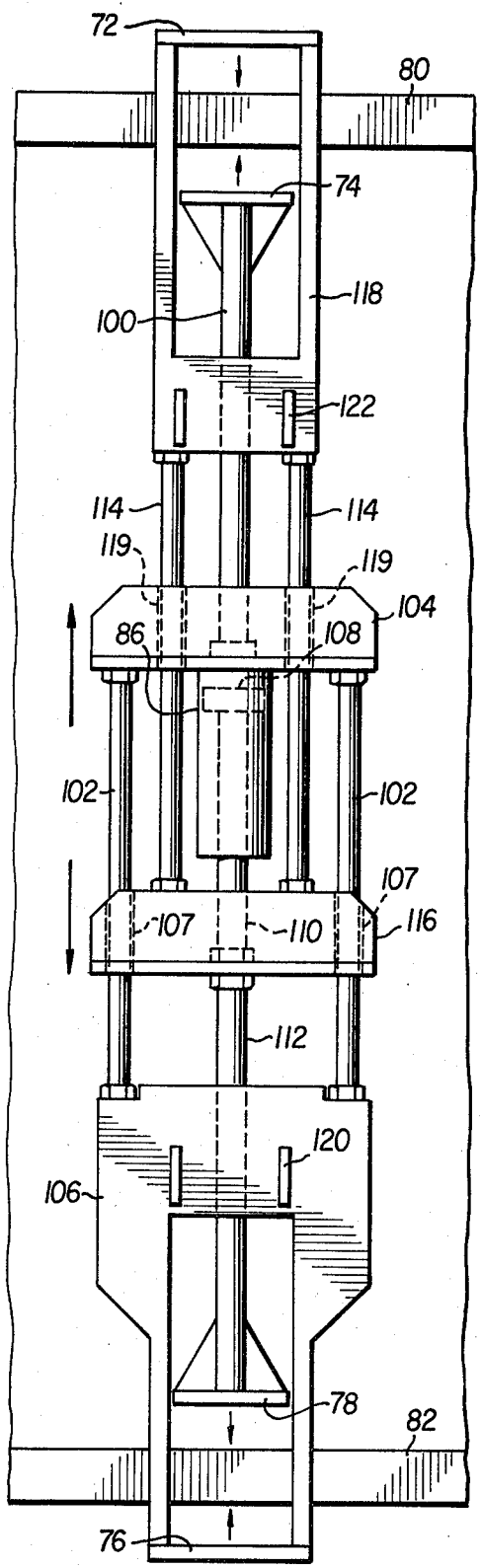
FIGS. 4A and 4B are top views of the embodiment of the present invention shown in FIG. 3, illustrating the operation of the braking mechanism.
Figure 4B:
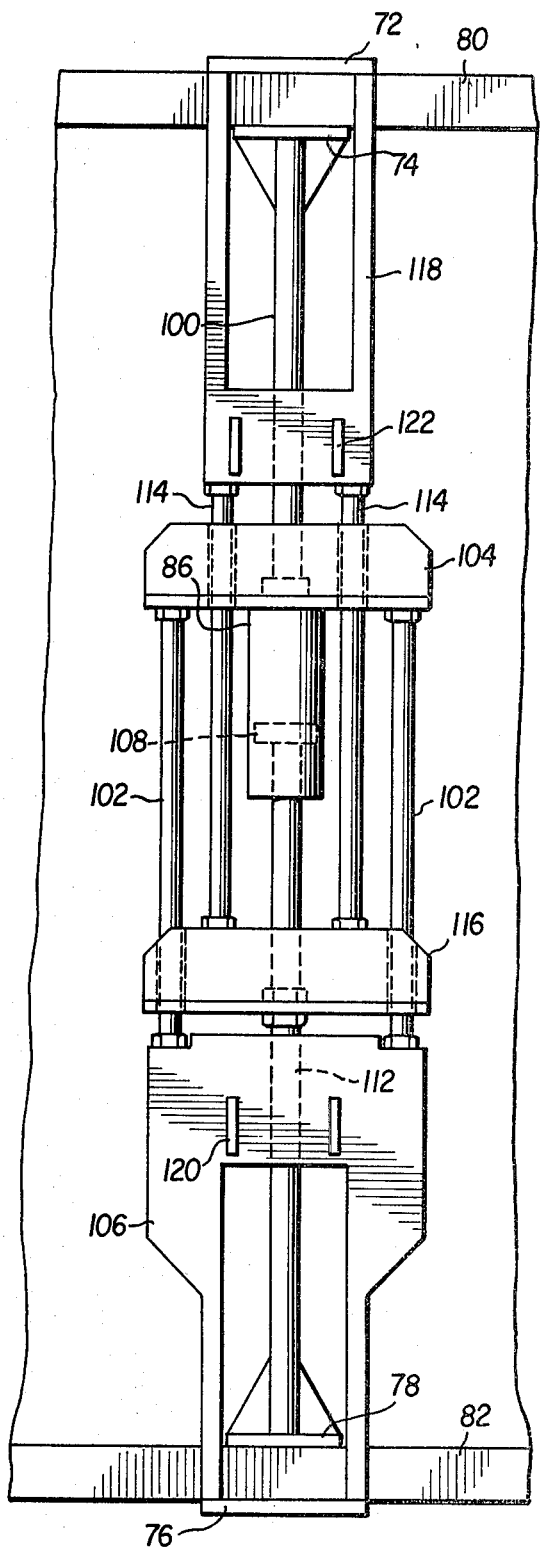

The operation of the brake shoe rack in clamping and unclamping the side walls of the gondola car is best illustrated in FIGS. 4A and 4B, wherein like structures and features shown in FIG. 3 are identified with like numerals. Specifically, FIG. 4A shows the brake shoe rack with the pairs of brake shoes separated from one another a sufficient distance to unclamp the side walls of the gondola car while FIG. 4B shows the brake shoe rack with the pairs of brake shoes clamping the side walls of a gondola car.

As best shown in FIG. 4A, the cylinder 86 is rigidly connected to the inner brake shoe 74 of the first pair of brake shoes and to the outer brake shoe 76 of the second pair of brake shoes. The rigid connection of the inner brake shoe 74 to the cylinder 86 is effected by means of a push rod 100. The rigid connection of the outer brake shoe 76 to the cylinder is effected by a first pair of pull rods 102 which are attached between an outer brake shoe frame member 106 and a tie bar 104, connected to the cylinder 86. Advantageously, the pull rods may pass through sleeves (shown in phantom FIG. 4A) in a second tie bar 116. This arrangement enhances the rigidity of the brake shoe rack.

The hydraulic ram also includes a piston 108 (shown in phantom) which moves a piston rod 110 with respect to the cylinder 86. The piston rod 110 is rigidly connected to the inner brake shoe 78 by means of a push rod 112. The piston rod is also rigidly connected to the outer brake shoe 72 by means of a second pair of pull rods 114 which are connected between a second tie bar 116 and an outer brake shoe frame member 118 attached to the outer brake shoe 72. Advantageously, the pull rods 114 may pass through sleeves 119 (shown in phantom in FIG. 4A) in the first tie bar 104. The piston rod 110 is connected to the second tie bar 116 and is adapted to move the entire assembly consisting of the tie bar 116, pull rods 114, frame member 118 and outer brake shoe 72.

The outer brake shoe frame members 106 and 118 are connected, respectively, to the hydraulic rams 88 and 90, shown in FIG. 3, by means of pivot mounts 120 and 122. The opposite ends of the hydraulic cylinders 88 and 90 are connected to the vertical supporting members 96 by the structure shown in detail in FIG. 5, wherein like structures and features are identified with like numerals as employed in FIG. 3. As shown in FIG. 5 the piston rod 92 is attached to the supporting members 96 by the ball joint 98. The hydraulic cylinder is thus rendered pivotable about an axis 130 horizontal in the plane of the figure and a second axis 132 perpendicular to the plane of the figure. The ball joints permit the brake shoe rack to "float" from side to side with respect to the chassis 14' of the gondola car loader.

The operation of the embodiment of the braking mechanism of the present invention shown in the figures will now be described. When the gondola car loader is positioned completely over a single gondola car, as shown in FIG. 1, the brake shoe rack may be lowered into the position shown in FIG. 3 by actuating the hydraulic rams 88 and 90 so that the piston rods are fully extended. When braking is not desired, the hydraulic rams 88 and 90 may be actuated to contract thereby raising the brake shoe rack with respect to the chassis 14'. In this way, the brake shoe rack may be raised when the gondola car loader is moved to an adjacent gondola car so that the inner brake shoes 74 and 78 do not impact on the end walls of the gondola cars as the gondola car loader crosses the gap between the gondola cars.

To effect braking, the brake shoe rack is lowered with the opposing brake shoes separated as shown in FIG. 4A. Once the brake shoe rack is lowered, hydraulic fluid may be pumped into the cylinder 86, with the result that the piston 108 moves relatively to the cylinder and imparts motion to the components of the brake shoe frame indicated by the arrows in FIG. 4A. The brake shoe rack would then generally center itself with respect to the walls of the gondola car and clamp the side walls between the pairs of brake shoes, as shown in FIG. 4B, thus effecting a braking action inhibiting further movement of the gondola car loader along the upper edges of the side walls of the gondola car.

It will be readily apparent that the braking mechanism described above is capable of adapting itself to irregularly shaped or bowed side walls of a gondola car. Moreover, the braking mechanism will tend to straighten the walls of the gondola car to the extent that it will force the side walls to assume a position having a uniform distance therebetween dictated by the dimensions of the brake shoe rack.

Thus, the braking mechanism is effective to halt the movement of the gondola car loader in spite of irregularities in the side walls of the gondola car while being raisable to avoid the end walls of the gondola car when the gondola car loader is moved across gaps between the cars. Finally, the braking mechanism is effective to straighten the walls of the gondola cars on which it is used.

The principles, preferred embodiments, and modes of operation of the present invention have been described in the foregoing specification. However, the invention which is intended to be protected is not to be construed as limited to the particular forms disclosed, since these are to be regarded as illustrative rather than restrictive. Variations and changes may be made by those skilled in the art without departing from the spirit of the invention.

What is claimed is:

1. A brake mechanism for a vehicle moveable along the top of adjacent gondola cars, the vehicle having a chassis moveably supportable by wheels on the upper edges of side walls of the gondola cars, comprising:
   a brake shoe rack including:
      a first pair of brake shoes, selectively moveable in opposition to one another to clamp a first side wall of a gondola car, said first pair of brake shoes including an inner brake shoe for engaging the inside of the first side wall and an outer brake shoe for engaging the outside of the first side wall;
      a second pair of brake shoes, selectively moveable in opposition to one another to clamp a second side wall of the gondola car, including an inner brake shoe for engaging the inside of the second side wall and an outer brake shoe for engaging the outer side wall; and
      a braking hydraulic ram for moving said brake shoes to clamp and unclamp the side walls of the gondola car, said hydraulic ram having a cylinder coupled to the inner brake shoe of the first pair of brake shoes and to the outer brake shoe of the second pair of brake shoes; and a piston coupled to the outer brake shoe of the first pair of brake shoes and to the inner brake of the second pair of brake shoes; and
   hydraulic ram means for pivotably supporting the brake shoe rack from the vehicle chassis while permitting the brake shoe rack to move from side to side relative to the chassis, whereby the brake shoe rack is moveable from side to side relative to the chassis to enable the brake mechanism to accommodate gondola car side walls which are bowed or otherwise irregularly shaped,
   said hydraulic ram means also being operative for raising and lowering the brake shoe rack relative to the chassis, whereby the brake shoe rack is raiseable and lowerable to clear end walls of the gondola car as the vehicle is moved across gaps between adjacent gondola cars.

2. The brake mechanism of claim 1 further comprising:
   a push rod rigidly connected between the cylinder of the braking ram and the inner brake shoe of the first pair of brake shoes;
   a first pull rod means for rigidly connecting the cylinder of the braking ram and the outer brake shoe of the second pair of brake shoes, said first pull rod means extending in a direction opposite to that of the push rod;

a piston rod coupled to the piston of the braking ram, said piston rod being rigidly connected to the inner brake shoe of the second pair of brake shoes; and a second pull rod means for rigidly connecting the piston rod and the outer brake shoe of the first pair of brake shoes, said second pull rod means extending in a direction opposite to that of the piston rod.

3. A brake mechanism for a vehicle movable along the top of adjacent gondola cars, the vehicle having a chassis movably supportable by wheels on the upper edges of side walls of the gondola cars, comprising:

a brake shoe rack including:
  a first pair of brake shoes, selectively movable in opposition to one another to clamp a first side wall of a gondola car, said first pair of brake shoes including an inner brake shoe for engaging the inside of the first side wall and an outer brake shoe for engaging the outside of the first side wall;
  a second pair of brake shoes, selectively movable in opposition to one another to clamp a second side wall of the gondola car, including an inner brake shoe for engaging the inside of the second side wall and an outer brake shoe for engaging the outer side wall; and
  a braking hydraulic ram for moving said brake shoes to clamp and unclamp the side walls of the gondola car, said hydraulic ram having a cylinder coupled to the inner brake shoe of the first pair of brake shoes and to the outer brake shoe of the second pair of brake shoes; and a piston coupled to the outer brake shoe of the first pair of brake shoes and to the inner brake of the second pair of brake shoes; and means for supporting the brake shoe rack from the vehicle chassis, while permitting the brake shoe rack to move from side to side with respect to the chassis, and for raising and lowering the brake shoe rack with respect to the chassis, whereby the brake shoe rack is raisable and lowerable to clear end walls of the gondola car as the vehicle is moved across gaps between adjacent gondola cars and whereby the brake shoe rack is movable from side to side with respect to the chassis to enable the brake mechanism to accommodate gondola car side walls which are bowed or otherwise irregularly shaped, said supporting means including a first hydraulic ram having a cylinder and piston rod, one of the cylinder and piston rods being pivotally mounted on the vehicle chassis and the other being pivotably connected to the outer shoe of the first pair of brake shoes; and a second hydraulic ram having a cylinder and piston rod, one of the cylinder and piston rods being mounted on the chassis and the other being pivotably coupled to the outer brake shoe of the second pair of brake shoes.

4. The brake mechanism of claim 3 wherein the first and second hydraulic rams are each mounted to the chassis by means of a ball joint.

5. A brake mechanism for a vehicle movable along the top of adjacent gondola cars, the vehicle having a chassis movably supportable by wheels on the upper edges of side walls of the gondola cars, comprising:

a brake shoe rack including:
  a first pair of brake shoes, selectively movable in opposition to one another to clamp a first side wall of a gondola car, said first pair of brake shoes including an inner brake shoe for engaging the inside of the first side wall and an outer brake shoe for engaging the outside of the first side wall;
  a second pair of brake shoes, selectively movable in opposition to one another to clamp a second side wall of the gondola car, including an inner brake shoe for engaging the inside of the second side wall and an outer brake shoe for engaging the outer side wall; and
  a braking hydraulic ram for moving said brake shoes to clamp and unclamp the side walls of the gondola car, said hydraulic ram having a cylinder coupled to the inner brake shoe of the first pair of brake shoes and to the outer brake shoe of the second pair of brake shoes; and a piston coupled to the outer brake shoe of the first pair of brake shoes and to the inner brake of the second pair of brake shoes;

means for supporting the brake shoe rack from the vehicle chassis, while permitting the brake shoe rack to move from side to side with respect to the chassis, and for raising and lowering the brake shoe rack with respect to the chassis, whereby the brake shoe rack is raisable and lowerable to clear end walls of the gondola car as the vehicle is moved across gaps between adjacent gondola cars and whereby the brake shoe rack is movable from side to side with respect to the chassis to enable the brake mechanism to accommodate gondola car side walls which are bowed or otherwise irregularly shaped, a push rod rigidly connected between the cylinder of the braking ram and the inner brake shoe of the first pair of brake shoes;

a first pull rod means for rigidly connecting the cylinder of the braking ram and the outer brake shoe of the second pair of brake shoes, said first pull rod means extending in a direction opposite to that of the push rod, said first pull rod means comprising a pair of pull rods with their principal axes parallel to the principal axis of the piston rod and on opposite sides thereof;

a piston rod coupled to the piston of the braking ram, said piston rod being rigidly connected to the inner brake shoe of the second pair of brake shoes;

a second pull rod means for rigidly connecting the piston rod and the outer brake shoe of the first pair of brake shoes, said second pull rod means extending in a direction opposite to that of the piston rod, said second pull rod means comprising a second pair of pull rods with their principal axes parallel to the principal axis of the piston rod and on opposite sides thereof;

a first tie bar connecting said cylinder to said first pair of pull rods, said second pair of pull rods being slidably movable through guideways in said first tie bar; and a second tie bar connecting said piston rod to said second pair of pull rods, said first pair of pull rods being slidably movable through guideways in said second tie bar.

6. A brake mechanism for a vehicle moveable along the top of a gondola car, the vehicle having a chassis moveably supportable by wheels on the upper edges of side walls of the gondola car, comprising:

a brake shoe rack carrying two pairs of brake shoes and a braking hydraulic ram, the first pair being movable by said braking hydraulic ram in opposition to one another to clamp a first side wall of a gondola car therebetween and the second pair of brake shoes being movable by said braking hydraulic ram in opposition to one another to clamp a second side wall of the gondola car therebetween, said pairs of brake shoes moving in opposition simultaneously; and hydraulic ram means for pivotably supporting the brake shoe rack from the vehicle chassis so as to permit the brake shoe rack to move from side to side relative to the chassis and for raising and lowering the brake shoe rack relative to the chassis, whereby the brake shoe rack is raiseable and lowerable to clear end walls of the gondola car as the vehicle is moved across gaps between adjacent gondola cars.

* * * * *